United States Patent

[11] 3,599,110

[72] Inventor Abraham M. Gindi
San Jose, Calif.
[21] Appl. No. 024,310
[22] Filed Mar. 31, 1970
[45] Patented Aug. 10, 1971
[73] Assignee International Business Machines Corporation
Armonk, N.Y.

[54] SELF-CLOCKING SYSTEM HAVING A VARIABLE FREQUENCY OSCILLATOR LOCKED TO LEADING EDGE OF DATA AND CLOCK
6 Claims, 8 Drawing Figs.

[52] U.S. Cl. .......... 331/10, 331/1 A, 331/17, 331/18, 331/25
[51] Int. Cl. .......... H03b 3/06
[50] Field of Search .......... 331/10, 18, 25, 17, 1 A

*Primary Examiner*—John Kominski
*Attorneys*—Hanifin and Jancin and Edward M. Suden

ABSTRACT: The invention relates to a self-clocking system having a variable frequency oscillator which corrects for changes in frequency and phase between a data signal and a clock signal, such that the data signal will have the same phase relationship to the clock signal regardless of the frequency of the data signal.

INVENTOR
ABRAHAM M. GINDI
BY Edward M. Suden
AGENT

SELF-CLOCKING SYSTEM HAVING A VARIABLE FREQUENCY OSCILLATOR LOCKED TO LEADING EDGE OF DATA AND CLOCK

BACKGROUND OF THE INVENTION

1. Field of the Invention

This invention relates to a novel and improved synchronization system useful in a binary data processing apparatus, wherein a clock signal is synchronized with incoming random data such that the incoming random data will always have a fixed phase relationship with the clock signal regardless of the frequency of the incoming random data.

2. Description of the Prior Art

In a magnetic storage system employed for recording and reproducing binary data signals, particularly high density or high frequency signals, it is important that each data pulse is referenced to discrete bit cells or time slots, or else the readout may be erroneous. Generally, the data pulse is referenced to a uniform clock or timing pulse of a related frequency which defines the bit cell.

It is known that spurious variations in mechanical or electrical parameters of a storage system causes unwanted displacement of the signal being processed, thus, necessitating frequency and phase compensation. To this end, synchronization systems, servosystems, phase lock oscillator circuits, separation circuits and the like are employed.

It is apparent that when operating with high density data processing apparatus, wherein the clock and data pulses are closely packed, the phase as well as the frequency of the clock and data must be held to close tolerances in order to achieve an accurate readout. To this end, the Type II variable frequency oscillators have been found to be the most advantageous. In a Type II VFO, phase error detection is accomplished by a phase discriminator circuit that generates an error signal whose width is proportional to the deviation of the synchronizing input pulse from the mid point between two clock output pulses. This error signal gates a constant current of the proper polarity into an integrating capacitor that controls the output clock frequency. In order to operate on random data, the phase discriminator must be designed to accept zeros or missing sync bits. To accomplish this, the data pulses are standardized to equal one-half of a cycle time. The phase discriminator then compares the trailing edge of the standardized pulse to the leading edge of the clock pulse and generates one of two possible signals whose width is proportional to the difference in time between the two transitions. The clock and data pulses are also fed to a data separator circuit which identifies each data bit with its proper bit cell by comparing the leading edge of each data bit to the leading edge of the clock pulses. There is, therefore, an inconsistency in the two circuits which introduce a new tolerance into the system equal to the tolerance of the data pulse standardizer. This system is such that when the data pulses shift frequency, the Type II VFO will compensate and bring the clock frequency into agreement with the data frequency, however, due to the standardizing of the data bits regardless of the data bit frequency, there is introduced into the system a constant phase error for each frequency that is different from the nominal frequency, that is, the frequency to which the system was designed to operate under nonerror conditions.

It is, therefore, an object of this invention to provide a variable frequency oscillator that will not only correct for frequency shift in the data by correcting the clock frequency, but also will maintain a fixed constant phase relationship between the data and the clock regardless of the frequency that the system is operating at.

It is another object of this invention to modify the Type II variable frequency oscillator such that the inherent phase error that exists due to frequency correction is eliminated.

SUMMARY OF THE INVENTION

The self-clocking code used in this invention defines a binary one as the presence of a negative transition during a data bit cell period and a binary zero as the absence of a negative transition during a data bit cell period and a binary zero as the absence of a negative transition during a data bit cell period. No clock synchronization pulses are used in the incoming data stream, thus allowing a high data rate.

According to this invention, the synchronization system comprises a data cell error voltage generator and timing circuitry, a voltage controlled current source network, an error voltage performing circuitry, and a voltage controlled oscillator. The data cell error voltage generator and timing circuitry generates, first, data clock pulses from the output of the variable controlled oscillator; secondly, an error voltage which is proportional to the phase relationship between the leading edge of a data pulse and the leading edge of a clock pulse; and thirdly, a gating signal that is present whenever the data pulses represents a binary one. The voltage controlled current source network converts the error voltage from the data cell error voltage generator into a constant current of a proper value whenever the gating signal indicates the presence of a binary one. The error voltage forming circuitry generates an error voltage from the output of the voltage controlled current source network and its output is used to control the voltage controlled oscillator. It should be noted that the error voltage forming circuitry will present a correction voltage to the voltage controlled oscillator even when the incoming data bit is a binary zero. The error voltage generated by the error voltage forming circuitry is comprised of two correction error voltage components, a first error voltage component for correcting for frequency deviations and a second error voltage component for correcting phase deviations.

The synchronization system of this invention allows for correction of shift in phase and/or for shift in frequency. The major advantage of this synchronization system is that it restores the desired phase relationship between the data and the clock as the system corrects for changes in frequency. This apparatus, therefore, renders the ultimate in synchronizing circuits for it not only corrects for changes in frequency, but maintains the proper phase relationship between data and clock regardless of the frequency of the data.

It is evident that the zero phase error cannot exist during a phase and frequency adjustment. It exists after the VFO has been synchronized to the frequency and phase of the incoming data. Assume the incoming data contains constant frequency and phase, but also contains instantaneous jitter and bit shift such that the cumulative average phase and frequency errors are constant, then there will be zero phase error between the average data and the VCO clock pulses.

Zero phase error is defined as having the negative transition in the raw data occur at a desired time after a negative transition occurs in the clock. Normally the negative raw data transition occurs midway between two adjacent negative transitions of the clock.

BRIEF DESCRIPTION OF THE DRAWINGS

The foregoing and other objects, features and advantages of the invention will be apparent from the following, more particular, description of the preferred embodiment of the invention as illustrated in the accompanying drawings, in which.

Figure 1:
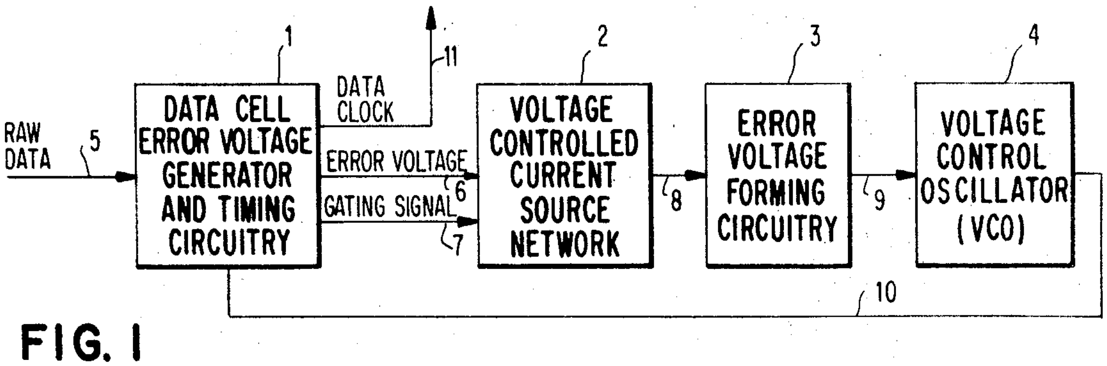
FIG. 1 is a block diagram of the synchronizing system, in accordance with this invention.

DESCRIPTION OF THE PREFERRED EMBODIMENT:

FIG. 1 shows a block diagram of the synchronization system of the invention. The synchronization system is a self-clocking synchronization system, that is, the data controls the clock such that the clock is at the same frequency and phase as the incoming data to assure proper detection of the data. The raw data is inputted on line 5 to the data cell error voltage generator and timing circuitry 1. The data cell error voltage generator and timing circuitry 1 generates a data clock which is outputted on line 11, a cell error voltage for each bit cell which is outputted on line 6 and a gating signal, to indicate that a proper cell error voltage has been developed, which is outputted on line 7. The voltage controlled current source network 2 has as its inputs the error voltage on line 6 and the gating signal on line 7. The voltage controlled current source network 2 generates a constant current whose magnitude is determined by the magnitude of the cell error voltage and whose sign is controlled by the sign of the cell error voltage for the time controlled by the gating signal. The output of the voltage controlled current source network 2 is a constant current which appears on line 8 for a period controlled by the gating signal on line 7. The error voltage forming circuitry 3 generates a correction error voltage for controlling the voltage controlled oscillator during each bit cell. To form the correction error voltage, the error voltage forming circuitry 3 receives the burst of current from the voltage controlled current source network 2. A discussion of the composition of the correction error voltage generated by the error voltage forming circuitry 3 will be presented in detail in the following discussion. The voltage controlled oscillator 4 receives the correction error voltage on line 9 from the error voltage forming circuitry 3. The voltage controlled oscillator 4 generates a sawtooth waveform of constant amplitude but varying frequency as a function of the correction error voltage that is present on line 9. The data cell error voltage generator and timing circuitry 1 has as its input the output of the voltage controlled oscillator 4 and derives from the output of the voltage oscillator 4 and derives from the output of the voltage controlled oscillator 4 proper timing for the synchronizing system.

Figure 2:
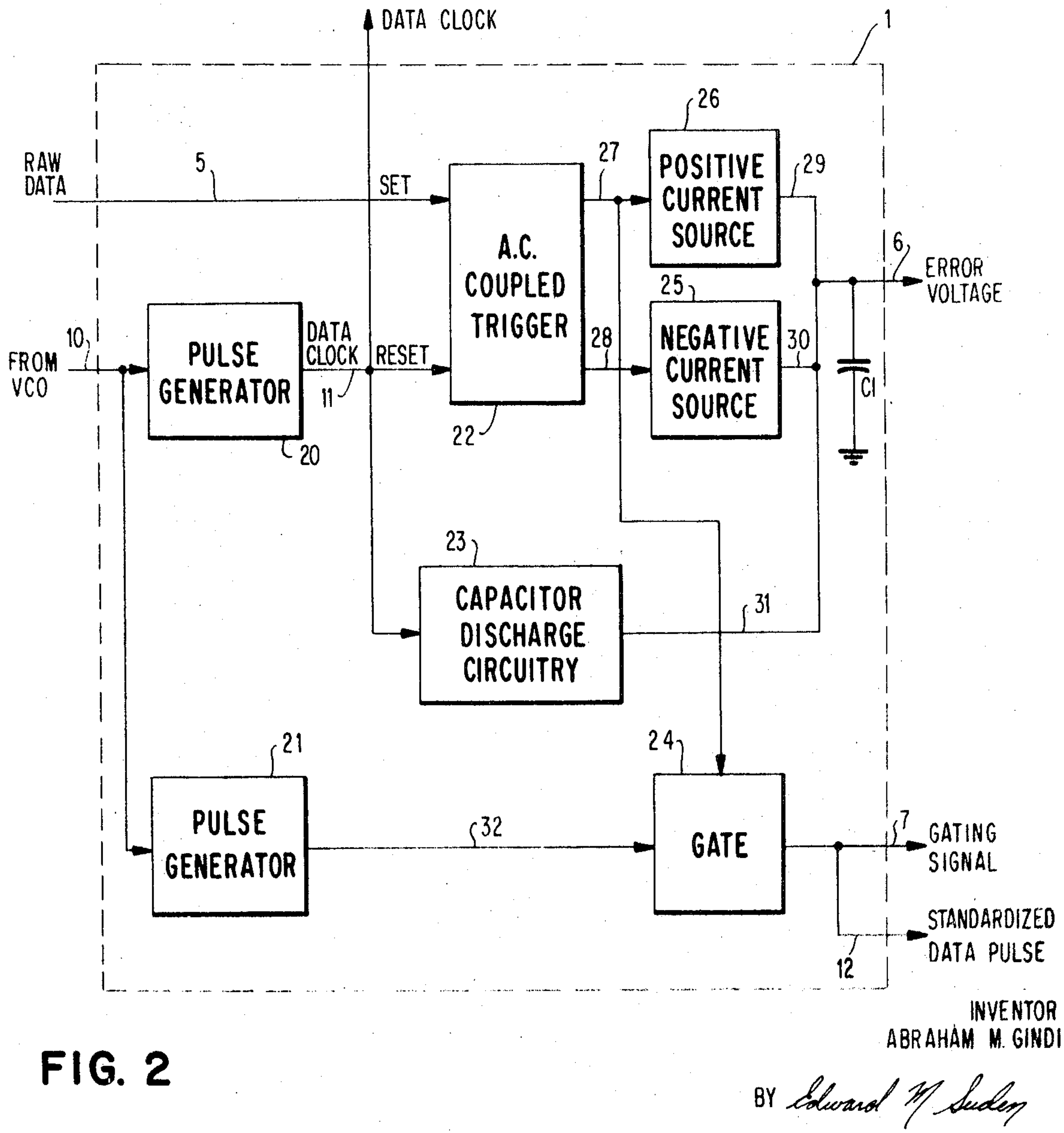
FIG. 2 is a block diagram of the first embodiment of the data cell error voltage generator and timing circuitry of FIG. 1.
Figure 6:
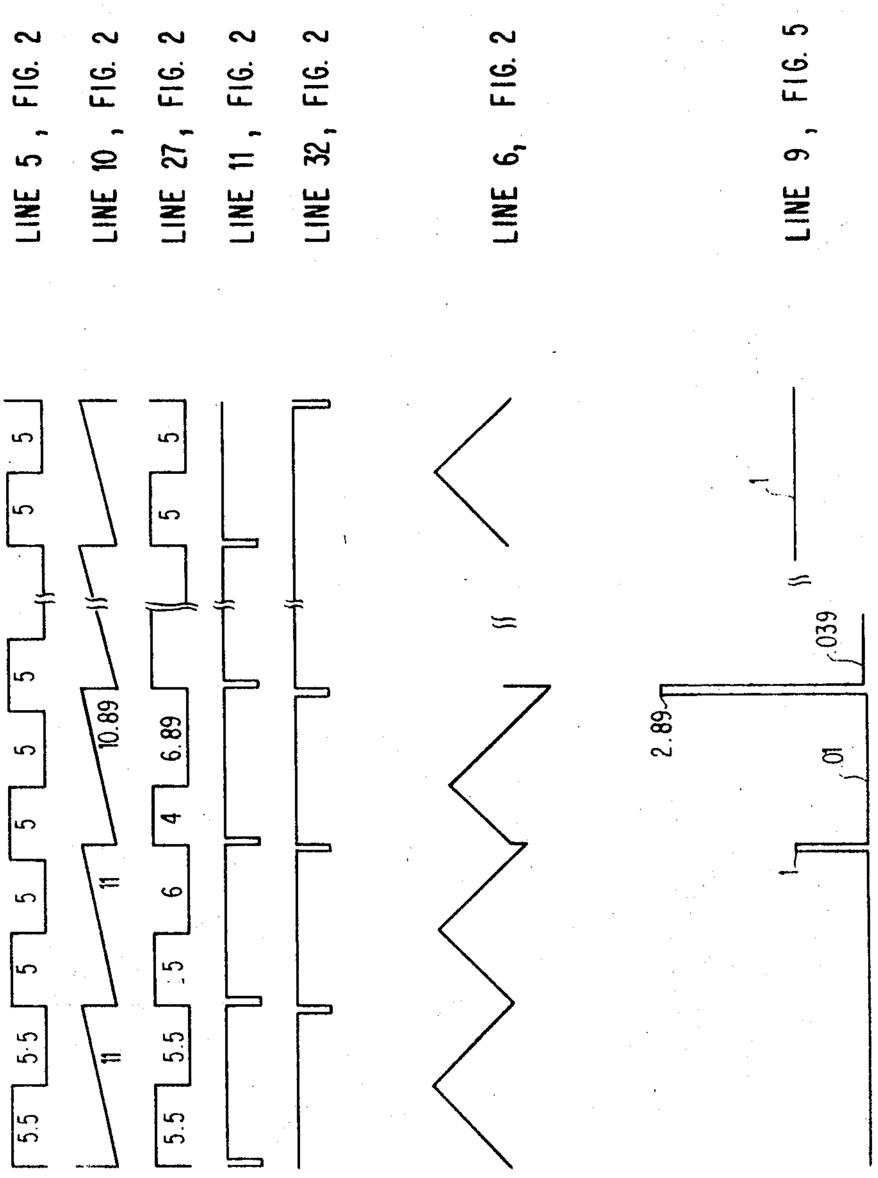
FIG. 6 is a series of waveforms to aid in the explanation of the invention.

Referring to FIG. 2, a block diagram of a first embodiment of the data cell error voltage generator and timing circuitry 1 is shown. FIG. 6 shows the timing waveforms generated in the data cell error voltage generator and timing circuitry 1 as shown in FIG. 2. Pulse generator 20 generates data clock pulses on line 11 as shown in FIG. 6 and pulse generator 21 generates gating pulses on line 32 as shown in FIG. 6. Both pulse generators 20 and 21 use the output from the variable clock oscillator 4 for generating these timing pulses. The AC coupled trigger 22 reacts to negative transitions on its set input and its reset input. The raw data input is shown as line 5 in FIG. 6 and the reset pulses are shown as line 11 of FIG. 6. It can be realized that the AC coupled trigger 22 acting on negative transitions will generate the waveform shown as line 27 of FIG. 6, which is an output on line 27 of the AC coupled trigger 22. The waveform on the output line 28 of the AC coupled trigger 22 is the complement of the waveform shown on line 27. The positive current source 26 is controlled from the output line 27 of the AC coupled trigger 22. The positive current source 26 will generate a positive current during the time when the output of the AC coupled trigger 22 on the output line 27 is positive. In a similar manner, the negative current source 25 will generate a negative constant current for the period of time that the output of the AC coupled trigger 22 on line 28 is positive. It should be realized that the positive portion of the waveform on line 27 and the positive portion of the waveform on line 28 represents and is equal to one bit cell. The currents generated by the positive current source 26 and the negative current source 25 are connected to capacitor C1 via output lines 29 and 30 respectively. The positive current source 26 and the negative current source 25 charge capacitor C1 to such a value that the difference between the positive portion and the negative portion of the data bit cell on line 27 as shown in FIG. 6 is indicated by a voltage on capacitor C1. The voltage on capacitor C1 is the cell error voltage $E(n)$ which designates the difference in time of the occurrence of the leading edge of data to the leading edge of the clock; that is, the leading edges being defined as a negative transition during the data bit cell.

Pulse generator 20 also controls a capacitive discharge circuit 23 which discharges the cell error voltage $E(n)$ at the start of each data bit cell as defined by the negative transition from pulse generator 20. Pulse generator 21 conditions gate 24 via line 32 to generate a gating signal on line 7, and a standardized data pulse on line 12, if and only if, the signal on line 27 from the AC coupled trigger 22 is negative. The negative value of the signal on line 27 of the AC coupled trigger 22 signifies that a negative transition has occurred during the data bit cell and that a binary one has been received. It is desirous not to use the cell error voltage that is associated with a binary zero, since a binary zero is designated by the lack of a negative transition during a data bit cell, and that this condition would cause an erroneous cell error voltage $E(n)$ to be generated on capacitor C1 for that data bit cell time. Simply, it can be realized that without a negative transition to set the AC coupled trigger 22, the output on line 27 will always be positive, thus activating positive current source for the whole data bit cell regardless of the present phase or frequency of the raw data.

The output signal on line 12 is a series of standardized data pulses of a determined pulse width as controlled by pulse generator 21 and occurring in a time relationship such that a data pulse is generated for every binary one occurring in the raw data.

The following mathematical relationships will aid in the understanding of and are true for the operation of the data cell error voltage generator and timing circuitry 1 as shown in FIG. 2.

$$P_{(n)}=W_1(n)+W_2(n) \qquad (1)$$

$$P=W_1(n)+W_2(n-1) \qquad (2)$$

where $P_{(n)}$ equals the period of the $n$th cycle of the sawtooth waveform from the voltage controlled oscillator when no error voltage is applied to the voltage controlled oscillator 4, $W_1$ equals the time from the leading edge of data to the leading edge of clock and $W_2$ equals time from leading edge of data to leading edge of the previous clock pulse.

$$E_{(n)}=W_1(n)-W_2(n) \qquad (3)$$

where $E(n)$ equals the cell error voltage per data bit for the $n$th cell generated by the data cell error voltage and timing circuitry 1 of FIG. 2.

Figure 3:
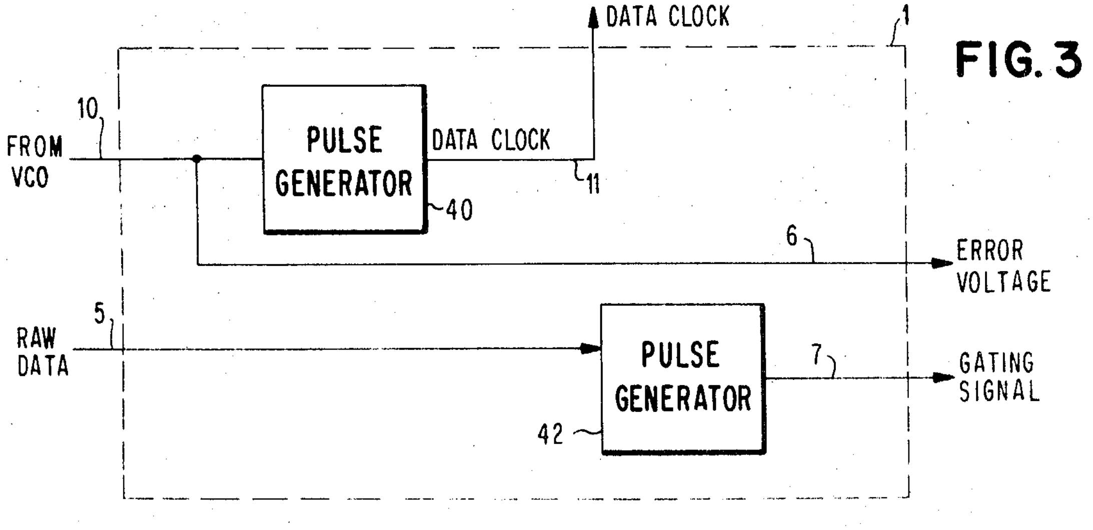
FIG. 3 is a second embodiment of the data cell error voltage generator and timing circuitry of FIG. 1.

A second embodiment of the data cell error voltage generator and timing circuitry can be found in FIG. 3. The sawtooth waveform from the VCO 4 which appears on line 10 has the additional characteristic that it is centered about a zero reference voltage; that is, the center of the ramp is equal to zero volts. Pulse generator 42 is used to generate a gating signal that occurs when the leading edge of the raw data signal, a negative transition, occurs during a data bit cell. A gating signal appears on output line 7 and the ramp signal from the VCO 4 appears as a cell error voltage on line 6. In effect, the data cell error voltage generator and timing circuitry 1 of FIG. 3 has generated a ramp to be sampled and a sampling pulse at a desired point in time.

Figure 4:
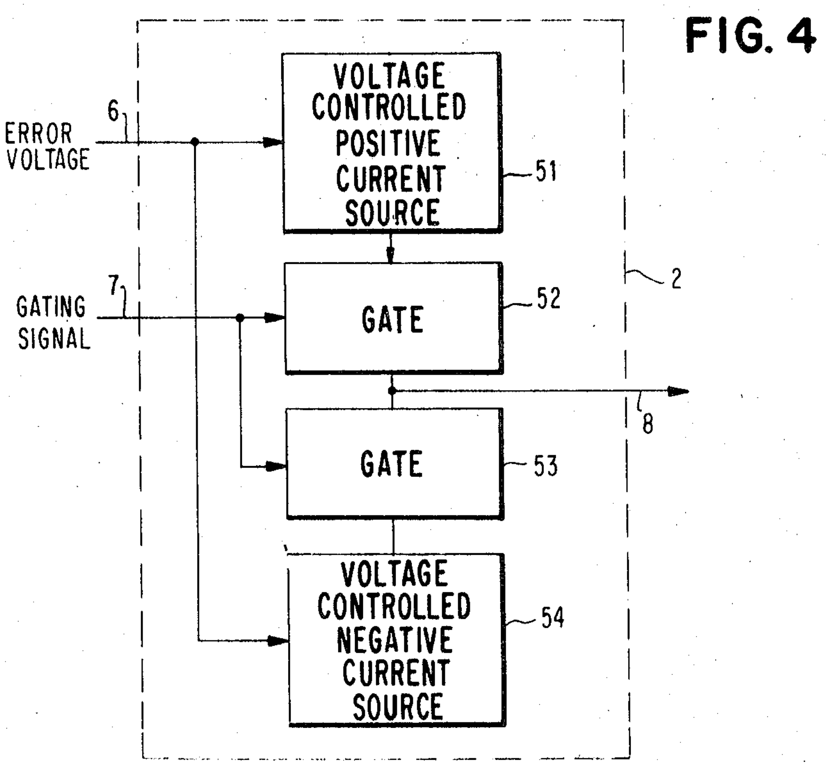
FIG. 4 is a block diagram of the voltage controlled current source network of FIG. 1.

FIG. 4 shows an embodiment of a voltage controlled current source network which has the characteristic of changing the cell error voltage $E(n)$ which appears on line 6 of the data cell error voltage generator and timing circuitry 1 at the time designated by the gating signal which appears on line 7 from the data cell error voltage generator and timing circuitry 1 into a current of a magnitude and polarity that is indicative of the magnitude and sign of the error voltage $E(n)$. It can be considered that the gating signal which appears on line 7 is relatively short and that the error voltage appearing on line 6 would appear to be of a constant value. The voltage controlled current source network as shown in FIG. 4 is comprised of a voltage controlled positive current source 51, a voltage controlled negative current source 54, and gates 52 and 53 to provide the proper gating of the proper current onto an output line 8. When the error voltage $E(n)$ on line 6 is positive, the voltage controlled positive current source 51 produces a positive current that is a function of the magnitude of the error voltage appearing on line 6. The voltage controlled negative current source 54 is inoperable when the error voltage appearing on line 6 is positive. In a similar manner, the voltage controlled negative current source 54 will be operational when the error voltage $E(n)$ appearing on line 6 is negative and the voltage voltage controlled positive current source 51 is inoperative. The current generated by voltage controlled positive current source 51 and voltage controlled negative current source 54 are gated onto line 8 by the gating signal appearing on line 7 by means of gates 52 and 53. The time which current will flow on line 8 is dictated by the length of time that the gating signal on line 7 conditions gates 52 and 53.

Figure 5:
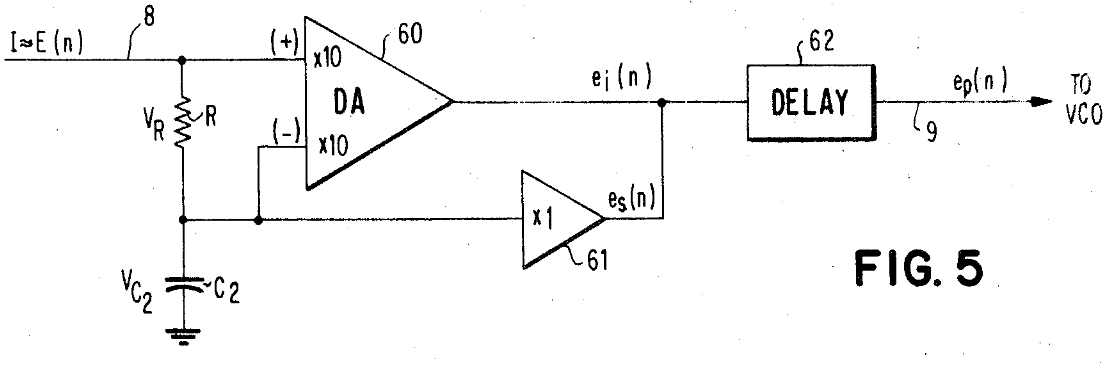
FIG. 5 is a schematic diagram of the error voltage forming circuitry of FIG. 1.

FIG. 5 shows the error voltage forming circuitry 3 for the voltage controlled oscillator 4. The error voltage forming circuitry 3 generates an error voltage $e_P(n)$ which controls the frequency, i.e., the slope, of the sawtooth waveform from the voltage controlled oscillator 4. The error voltage $e_P(n)$ changes the slope of the sawtooth waveform of the voltage controlled oscillator twice during each bit cycle for making corrections. The bit cell period $P(n)$ is equal to the period of the frequency of the incoming data $(T_0-T_2)$. The error voltage $e_P(n)$ during the time $T_0$ to $T_2$ is broken up into two different error voltages, $e_i(n)\,(T_0-T_1)$ and $e_s(n)\,(T_0-T_2)$ such that $e_P(n)\,(T_0-T_2)=e_i(n)\,(T_0-T_1)+e_s(n)\,(T_1-T_2)$ (4) The component $e_i(n)$ is indicative of the error voltage applied to the voltage controlled oscillator 4 during the time which current flows into the error voltage forming circuitry 3 on line 8 as controlled by the gating signal on line 7. The accumulative error voltage $e_s(n)$ is equal to the accumulated voltage on capacitor $C_2$ after current ceases to flow through resistor R as controlled by gating signal on line 7. It should be here noted, however, that the time $T_0$ to $T_1$ is constant and constitutes a very small portion of the time period $T_0$ to $T_2$; and, therefore the resulting charge on capacitor $C_2$ can be considered to be $e_s(n)$ for the entire time $T_0$ to $T_2$ without incurring a large error in the analysis.

The accumulative error voltage $e_s(n)$ is equal to the charge on capacitor $C_2$ which is equal to $V_{C_2}(n)$ which in turn is equal to the summation of an attenuation factor $y$ times the error voltage $V_R(j)$ for values of j from 1 to n which have been accumulated on capacitor $C_2$. The attenuation factor $y$ is equal to the change in charge on capacitor $C_2$ for a data cell divided by the voltage drop across resistor R for that same data cell. Attenuator factor $y$ is controlled by the values of $C_2$ and R. The instantaneous error voltage $e_i(n)$ is equal to multiplication factor X times the voltage drop $V_R$ across resistor R due to the proportional constant current through resistor R to charge capacitor $C_2$, when current flows on line 8 as controlled by the gating signal on line 7.

$$e_s(n)=V_{C_2}(n)=\sum_{j=l}^{j=n} y(e_i(j))/x=\sum_{j=l}^{j=n} yV_R(j) \quad (5)$$

$$e_i(n)=xV_R(n)\approx xE(n) \quad (6)$$

The control voltage fed to the VCO 4 during the time $T_0$ to $T_1$ is equal to $e_i(n)\,(T_0-T_1)+e_s(n)\,(T_0-T_1)$ and the error voltage supplied during the rest of the cycle, that is from time $T_1$ to $T_2$, is equal to $e_s(n)\,(T_1-T_2)$ only. The delay circuit 62 is included within this circuit so that the effects of the new error voltage will not be felt by the VCO 4 until after capacitor $C_1$ has been discharged by the timing pulse which appears on line 11 in order to provide a more stable system.

The voltage controlled oscillators 4 frequency is a function of the control voltage $e_P(n)$. Referring to FIG. 6, a graphic representation of the error voltage per unit time felt by the voltage controlled oscillator is depicted on line 9. As can be seen, a high voltage is felt for a short period of time and then a smaller voltage for the remaining period of time where the time between starts of high voltage pulses is indicative of a data bit cell as defined by the clock. When complete synchronization has occurred, the error voltage on line 9 will remain a constant value and will remain such as long as the data frequency remains constant at that frequency. The output of the VCO 4 is fed into the data cell error voltage generator and timing circuitry 1 to generate clock pulses as previously described by pulse generators 20 and 21.

OPERATION OF THE PREFERRED EMBODIMENT

In discussing the operation of the invention, a specific example will be used to simplify and aid in the understanding of the invention.

The following criterion will be used:

1. The first embodiment as shown in FIG. 2 of the data cell error voltage generator and timing circuitry will be used;
2. The multiplication factor x in the instantaneous error voltage $e_i$(*one unit*) *is equal to* 10;
3. The attenuation constant $y$ of $e_s(n)$ is equal to 0.1;
4. One unit of error voltage $E(n)$ is equal to one unit of time difference that is generated by the negative transition of the data signal not being in the center of the data bit cell as defined by the clock;
5. That the voltage control positive current source and voltage controlled negative current source 51 and 54 of the voltage controlled current source network 2 generate one unit of current per one unit of error voltage $E(n)$; and
6. That one unit of control voltage $e_p(n)$ will change the slope of the sawtooth waveform from the voltage controlled oscillator 4 by one unit.

Under these conditions, starting at any given data bit cell $(n-1)$, the instantaneous error voltage $e_i(n)$ and the accumulation error voltage $e_s(n-1)$ can be used to predict what the period of the next cycle of the VCO 4 will be.

Let: $P_n=A+P_{2n}$ (7) where $P_n$ equals the period of the next cycle from the VCO, and accumulation error voltage $e_s$ and $A$ equals the time that the instantaneous error voltage $e_i$ will be applied (which is a constant and in this example will be equal to one unit of time) and where $P_{2n}$ is equal to the remaining unit of time of the period $P_n$ during which time the summation error voltage $e_s$ will be applied only to the voltage controlled oscillator Let: $B=S_1A+S_2P_{2n}$ (8)

where B is the constant amplitude of the sawtooth waveform from the voltage controlled oscillator (which will be equal to unity in this example), $S_1$ is equal to the slope of the sawtooth during the time period $A$ and $S_2$ is equal to the slope of the sawtooth during the time period $P_{2n}$.

From equations (7) and (8):

$$P_n=[1-(S_1/S_2)]\,A+B/S_2 \quad (9)$$

From criteria 4, 5 and 6:

$S_1 = _{1/}[_P - _{ei}(n-1) - e_s(n-1)]$; and $(10s_2 = _{1/}[_p - _{es}(-1)]$ (11)

where $P$ is equal to the nominal period of the sawtooth waveform in multiples of units of time selected.

All the foregoing mathematical expressions can be used to predict the operation of the system. The system can therefore be simulated on a computer by these equations and the effects of changes in design criteria to the operational characteristics of the system may be obtained.

Figure 8:
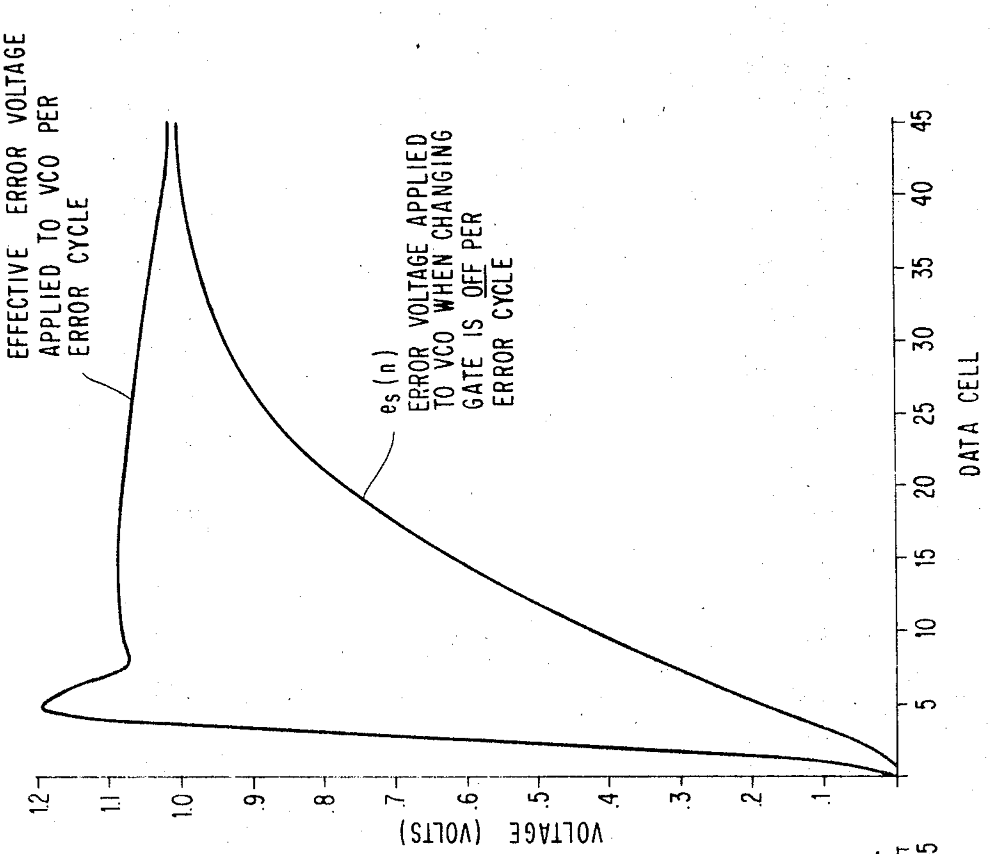
FIG. 8 is a graphic representation of the error voltage applied to the VCO when the charging gate is off per error cycle for a number of cycles and shows the effective error voltage applied to the VCO per error cycle for a number of error cycles.
Figure 7:
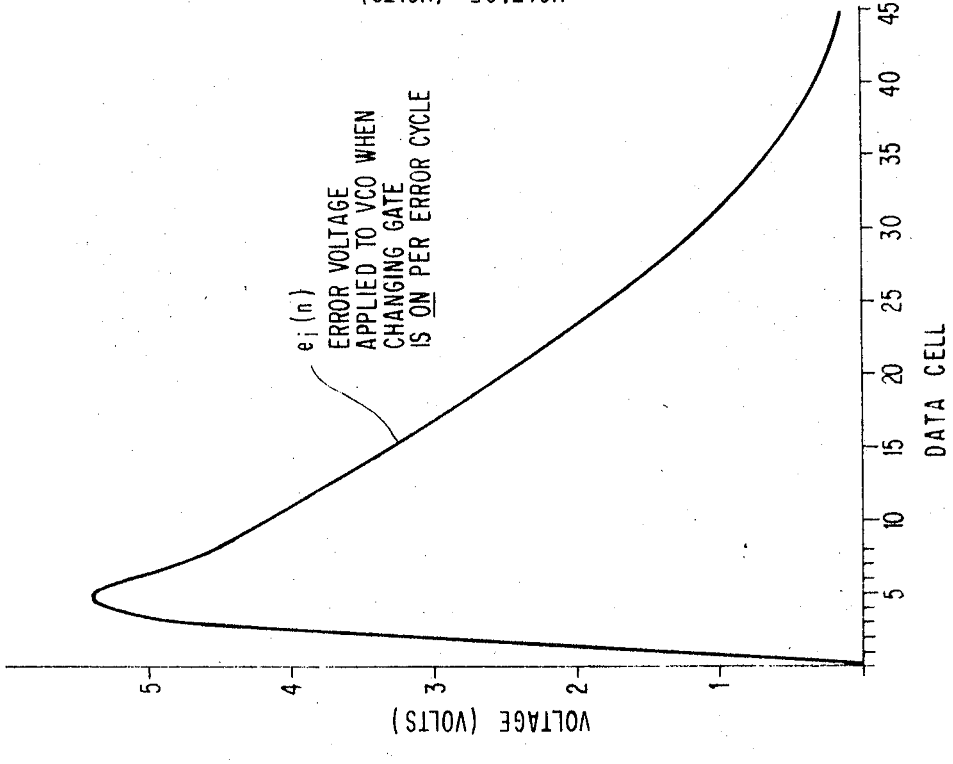
FIG. 7 is a graphic representation of the error voltage applied to the VCO when the charging gate is on per error cycle, for a number of cycles.

Assuming that the nominal period is equal to 11 units and that a frequency shift does occur such that the data frequency changes from a period of 11 units to 10 units, the synchronization system of the invention can be predicted to operate as depicted in FIGS. 6, 7 and 8.

FIG. 6, line 5 shows the data input frequency changing from a period of 11 units to 10 units. Also for the sake of simplicity, the input raw data is a series of 1's, that is, a negative transition will occur during each data bit cell. Line 10 shows that the sawtooth output from the VCO 4, is responsive to changes in the data frequency. The response of the entire synchronization system is damped so as not to go into oscillation. Line 27 shows the output of the AC coupled trigger of the data cell error voltage generator and timing circuitry 1 of FIG. 2. As is evident by line 27, as the data frequency of line 5 shifts from 11 units to 10 units the positive and negative periods of line 27 become unequal and an error voltage is generated that is equal to the difference between the period of the positive and negative portions of the data bit cell.

FIG. 7 shows the instantaneous error voltage $e_i(n)$ for 45 data cells as defined by the sawtooth waveform from the voltage controlled oscillator 4. The instantaneous error voltage is attempting to correct for a phase error during the defined period $T_0$ to $T_1$, and as can be seen from FIG. 7, $e_i(n)$ approaches 0.

Now referring to FIG. 8, the summation error voltage $e_s(n)$ is one unit It should be here noted that in this given example, a frequency shift down of one unit (11 units to 10 units); that is, an increase in frequency of 10 percent required that one unit of voltage $e_p(n)$ must be supplied constantly to VCO 4 to bring VCO 4 into frequency synchronization with the data frequency. That is to say, the frequency of the VCO 4 represented by 10 units is equal to the nominal frequency which is represented by 11 units minus one unit of correction. Therefore, in viewing FIG. 8, it can be realized that as the summation error voltage $e_s(n)$ approaches 1, the instantaneous error voltage $e_i(n)$, as shown in FIG. 7, must approach zero. This would indicate that the system is correcting to the proper frequency and adjusting the phase error to zero such that the negative transition of the data will appear in the center of the sawtooth waveform generated by the voltage controlled oscillator 4.

FIG. 8 also shows the effective error voltage applied to the VCO per data cell. This is a fictitious error voltage, but demonstrates what the values of the corrections error voltages must have been under the prior art per data cycle in order to achieve the desired frequency and simultaneous phase correction. There is, at present, no such apparatus that will general the effective error voltage per data cell as shown in FIG. 8 to accomplish the simultaneous frequency and phase adjusting of a data signal and a self-clocking signal.

It is felt that with the preceding teaching, it is well within the skill of the art to change various parameters of the circuit to obtain faster response than shown in the example herein used.

While the invention has been shown in a single phase data clock system it would be understood that the invention is directly applicable to multiphase data clocking systems.

While the invention has been particularly shown and described with reference to preferred embodiments thereof, it would be understood by those skilled in the art that various changes in form and detail may be made therein without departing from the spirit and scope of the invention invention.

What I claim is:

1. The method used in a self-clocking system for maintaining the clock frequency at the data frequency while maintaining a constant phase relationship between said clock frequency and said data frequency regardless of said data frequency comprising the steps of:

receiving said data signals at said data frequency;

generating a clock signal whose frequency is a function of a controlled signal;

comparing the time occurrence of the leading edge of said data signal to the leading edge of said clock signal for each period of said clock signal;

generating a first error signal as a function of said comparison;

transforming said first error signal into an instantaneous error signal if the data bit associated with the clock cycle that generated said first error signal was of a specific value;

accumulating all instantaneous error signals to form an accumulative error signal; and generating said control signal from said instantaneous error signal and said accumulative error signal.

2. A self-clocking system for maintaining the clock frequency at the data frequency while maintaining the constant phase relationship between said clock frequency and said data frequency regardless of said data frequency comprising a data input line for receiving said data signal;

a voltage controlled oscillator for generating a clock signal whose frequency is a function of a control signal;

a generating means for comparing the time occurrence of the leading edge of said data signal to the leading edge of said clock signal for each period of said clock signal and for generating a first error signal as a function of said comparison;

conversion means for transforming said first error signal into an instantaneous error signal if the data bit associated with the clock cycle that generated said first error signal was of a specified value, and control means for accumulating all instantaneous error signals to form an accumulative error signal and for generating said control signal from said instantaneous error signal and said accumulative error signal.

3. A self-clocking system for maintaining the clock frequency at the data frequency while maintaining a constant phase relationship between said clock frequency and said data frequency regardless of said data frequency comprising:

a data input line for receiving data signals;

a voltage controlled oscillator for generating a clock signal whose frequency is a function of a controlled signal;

a data cell error voltage generator and timing circuitry means connected to said data input line and to the output of said voltage controlled oscillator for comparing the time occurrence of the leading edge of said data signals on said data input line to the leading edge of said clock signals from the output of said voltage controlled oscillator for each period of said clock signal, for generating of cell error signal as a function of said comparison and for generating a gating signal which indicates that the data bit associated with the clock cycle that generated said bit error signal was of a specified value;

a voltage controlled current source network receiving the cell error signal and the gating signal from said data cell error voltage generator and timing circuitry means for transforming said cell error signal into an instantaneous error signal for a period of time dictated by said gating signal;

error voltage forming circuitry connected to the output of said voltage controlled current source network for accumulating all instantaneous error signals to form an accumulative error signal and for further generating said control signal from said instantaneous error signal and said summation error signal.

4. A self-clocking system as set forth in claim 3 wherein said voltage controlled current source network comprises means for transforming said cell error voltage signal into a current whose magnitude and sine is a function of the magnitude and sine of said cell error voltage; and gating means responsive to said gating signals to allow said current to flow for a period of time dictated by the length of said gating signal which appears only when the data bit associated with the clock cycle that generated said cell error voltage signal was of a specified value.

5. A self-clocking system as set forth in claim 3 wherein said data cell error voltage generator and timing circuitry means further comprises means for generating a standardized data pulse train corresponding to said data signals on said data input line.

6. A self-clocking system as set forth in claim 1 wherein the error voltage forming circuitry further comprises:

a resistor and capacitor series combination connected to the output of said voltage controlled current source network and ground wherein the instantaneous error voltage signal is generated across said resistor when the current from said voltage controlled current source network is allowed to flow by said gating means in said voltage controlled current source network; and said accumulative error voltage signal is accumulated and stored on said capacitor; and means for combining said instantaneous error voltage signal which appears across said resistor and said accumulative error voltage signal which appears across said capacitor in the desired manner to form a control voltage which is a composite of said instantaneous error voltage controlled signal and said accumulative error controlled signal.